United States Patent [19]

Myers et al.

[11] 4,289,729
[45] Sep. 15, 1981

[54] BIASED DEGASSER FOR FLUIDIZED BED OUTLET

[75] Inventors: George D. Myers; Paul W. Walters, both of Ashland, Ky.

[73] Assignee: Ashland Oil, Inc., Ashland, Ky.

[21] Appl. No.: 61,117

[22] Filed: Jul. 26, 1979

[51] Int. Cl.³ .............. F27B 15/08; F26B 17/10; B01J 8/28

[52] U.S. Cl. ............ 422/144; 34/57 A; 422/145; 422/147

[58] Field of Search .......... 422/144, 145, 147; 34/57 R, 57 A; 201/31

[56] References Cited

U.S. PATENT DOCUMENTS

| | | | |
|---|---|---|---|
| 2,379,734 | 7/1945 | Martin | 422/216 X |
| 2,382,382 | 8/1945 | Carlsmith et al. | 252/242 |
| 2,454,373 | 11/1948 | Blanding | 252/242 |
| 2,464,616 | 3/1949 | Schwarzenbek et al. | 422/144 X |
| 2,631,927 | 3/1953 | Trainer et al. | 422/144 |
| 2,722,476 | 11/1955 | Burnside et al. | 422/144 X |
| 2,829,007 | 4/1958 | Van Waveren | 422/144 X |
| 2,900,329 | 8/1959 | Osborne et al. | 208/164 |
| 2,901,331 | 8/1959 | Held et al. | 422/145 |
| 2,916,441 | 12/1959 | Kruse | 208/152 |
| 2,994,659 | 8/1961 | Slyngstad et al. | 208/113 |
| 3,394,076 | 7/1968 | Bunn et al. | 208/164 |
| 3,677,716 | 7/1972 | Weber et al. | 422/145 X |
| 3,806,324 | 4/1974 | MacLean et al. | 422/144 |
| 3,846,280 | 11/1974 | Owen et al. | 208/120 |
| 3,849,899 | 11/1974 | Jenkinson | 34/57 R X |
| 3,974,091 | 8/1976 | Parker et al. | 34/57 A X |
| 4,005,998 | 2/1977 | Gorman | 55/84 |
| 4,026,789 | 5/1977 | James | 208/74 |
| 4,032,299 | 6/1977 | Pulak | 422/144 |
| 4,099,927 | 7/1978 | McKinney | 422/144 |
| 4,138,219 | 2/1979 | Colvert et al. | 422/144 |

Primary Examiner—Barry Richman
Attorney, Agent, or Firm—Pollock, Vande Sande & Priddy

[57] ABSTRACT

A degaser is disclosed for an outlet conduit into which solids are transferred from a fluidized bed within a larger vessel and comprises a curvilinear wall extending upward from the upper end of the outlet conduit and beveled at an angle to the vertical to form an outlet with a rim having a high side and a low side. The degaser is positioned with its high side far below the solids inlet into the vessel and its low side near the bottom of the fluidized bed. The biased rim may take various shapes and the degaser wall may extend only partially around the upper conduit end. Fluidizing gas can be introduced into the bed either above or below the low side of the degaser. The degaser may also include a baffle arranged within the vessel in cooperative relation to the rim.

19 Claims, 5 Drawing Figures

BIASED DEGASSER FOR FLUIDIZED BED OUTLET

TECHNICAL FIELD

The present invention relates generally to the transfer of solid materials within a system, and more particularly, to the transfer of fluidized solid particles from a larger vessel or conduit to a smaller vessel or conduit. The invention is especially useful in the circulation of a fluidized solid catalyst between a reactor for contacting the catalyst with gaseous reactants and a regenerator for removing contaminates that deplete the catalyst during the catalytic reaction.

BACKGROUND ART

In the petroleum refining industry, a heavy oil feed stock of high boiling hydrocarbons is contacted at elevated temperatures with a fluidized solid catalyst in a reaction zone to effect conversion or "cracking" of at least a portion of the feed stock to lower boiling hydrocarbon products, such as gasoline. In modern cracking equipment, the reaction zone usually comprises a vertical pipe or riser into which is fed a mixture of hot catalyst and heavy oil feed stock. The riser ends in a reactor vessel where the hydrocarbon materials are rapidly separated from the catalyst to abruptly terminate the conversion reaction. During the conversion reaction, carbon in the form of coke is deposited on the solid catalyst particles and inhibits their catalytic activity. To maintain the effectiveness of the catalyst, coke contaminated catalyst is first stripped of residual hydrocarbons and then transferred to a fluidized bed regenerator where the catalyst is contacted with an oxygen containing gas at sufficiently high temperatures to burn off the coke and thereby regenerate the cracking activity of the catalyst. The high temperature required to burn the coke and the heat required for the conversion reaction are both supplied, at least in part, by the carbon combustion reaction which yields carbon oxides as combustion products. Both the oxygen containing gas and the combustion products will be referred to here as combustion gases. Since combustion gases are undesirable in the reaction products from the riser, regenerated catalyst is sometimes also stripped to remove those gases prior to returning the regenerated catalyst to the riser.

Spent catalyst is continuously withdrawn from the reactor through a carrier line and transferred to a stripper and then to a spent catalyst standpipe. Regenerated catalyst is continuously withdrawn from the regenerator and returned to the riser via a regenerated catalyst standpipe which may also be preceded by a carrier line and/or a regenerated catalyst stripper. Both the regenerator and the strippers usually contain a fluidized bed with a dense lower phase and a dilute upper phase. The dilute phase is comprised primarily of combustion gases or stripping media, together with smaller amounts of entrained catalyst, and the dense phase is comprised of solid catalyst particles with sufficient fluidizing gas or vapor to maintain the solid catalyst particles in a fluid-like state. Similar to the molecules of a liquid, the catalyst particles in the dense phase have a net downward component sufficient to produce gravity flow of the fluidized catalyst. Although the fluidizing and stripping medium in the stripper may be either an inert gas or an inert vapor, such as steam, it will be referred to generally as a stripping gas.

As used hereinafter, the term "fluidized bed" will refer only to the dense catalyst phase. Although many catalytic cracking units also employ a fluidized bed in the reactor, the use of extended risers within the reactor vessel has recently led to elimination of reactor fluidization in some of these units. Instead, catalyst leaving the riser falls into a loose bed at the bottom of the reactor. This non-fluidized bed is sufficiently dry and loose for the catalyst particles to flow by gravity into the next conduit or vessel. Thus, the reactor catalyst flows as a loose stream of particles down the carrier pipe into the spent catalyst stripper where it becomes fluidized by the stripping gas to form a fluidized bed only within the stripper itself. However, the diameter of the carrier pipe between the reactor and the stripper is often the same as that of the stripper and the top of the fluidized stripper bed may actually extend up into the carrier pipe, although the top of the bed is preferably maintained near the top of the main stripper section. By comparison, the catalyst medium seen by the regenerated catalyst standpipe, and the regenerated catalyst stripper where used, is a continuation of the fluidized bed maintained in the regenerator so that these latter components are generally at a greater bed depth where they are subjected to a higher fluid head.

The vessels and conduits used in a catalytic cracking unit or system are usually cylindrical in shape and of varying diameters, with the reactor vessel and the regenerator vessel having the largest diameters and the spent catalyst and regenerated catalyst standpipes having the smallest diameters. The strippers and related transfer or carrier conduits are usually of a diameter intermediate between the regenerator and reactor vessels and the standpipes. Whereas the heights of these components vary relatively little between units of different capacities, their diameters can vary widely depending on the overall catalyst circulation rate for which the unit is designed and the optimum mass flow density to be achieved in each component. The transfer of catalyst between the reactor and the regenerator therefore involves a relatively large flow of fluidized solids across transitions between vessels and conduits having significantly different diameters. For purposes of clarity, a smaller component receiving flow from a larger component will be referred to as a conduit and the larger component as a vessel. However, catalyst is conveyed by both vessels and conduits and these two terms are considered interchangeable in describing the invention. For example, the stripper performs both a conveying function and a stripping function and can be referred to as either a vessel or a conduit depending on the flow transition being discussed. These definitions are therefore not intended to be restrictive in any way.

The flow of fluidized solids from a larger vessel to a smaller conduit is hindered by the change in flow cross-section experienced by this moving mass of material. Because the same mass of catalyst per unit of time is transferred through both the vessel and the conduit, the mass velocity of the flowing stream increases markedly as the catalyst enters the conduit. This change in mass velocity, together with the flow resistance generated by the sharp edges of the vessel to conduit transition, produces a pressure drop across the outlet at the upper end of the conduit. In this environment, fluidizing gas from the vessel is entrained with the down flowing catalyst and then subsequently released in the conduit. The entrained gas is in excess of that required for fluidization and produces bubbles of catalyst free gas which can flow countercurrent to the catalyst back into the vessel or concurrent with the catalyst through the slide valve. The countercurrent flow of released gas within the conduit can produce flow restriction phenomena known as slugging and bridging. Slugging is a surging of fluidized material in the conduit caused by large bubbles of upflowing gas. Bridging is a complete loss of catalyst fluidity either in the conduit or across the opening of the rim defining the outlet between the vessel and the conduit. Slugging seriously hampers flow. Bridging can be of sufficient severity to stop flow through the conduit entirely. Flow stoppage may require taking the reactor off stream until the plug of unfluidized catalyst can be eliminated and catalyst flow through the conduit reestablished. Bridging of sufficient severity to stop catalyst flow seems to occur more frequently during unit start up before full operating conditions have been attained in the various components. This may be because flow patterns are relatively weak at these times and easily disrupted by flow resistance at the vessel-to-conduit transitions. Concurrent flow of released gas is also undesirable because it produces unstable pressure differentials and high levels of erosion at the slide valve.

The prior art contains patents disclosing withdrawal conduits for catalyst regenerator vessels where the conduit is extended up into the fluidized bed above the solids inlet and cut at an angle to the horizontal. Thus, U.S. Pat. No. 3,964,876 to James and U.S. Pat. No. 2,900,329 to Osborne et al. show overflow-type standpipes for regenerated catalyst where the open end has been cut on a diagonal to form an overflow weir. The solids outlet of these standpipes is therefore at the top of the fluidized bed where catalyst overflows the lower side of the opening but not the upper side to regulate the height of the catalyst bed. Since the gaseous phase of the regenerator has direct access to the standpipe, this arrangement can increase the amount of gas entrained with the catalyst and carried into the standpipe, a result to be avoided according to the present invention. In this regard, the express purpose of the beveled opening to the fluent tube 50' in U.S. Pat. No. 3,677,716 to Weber et al. is so that gaseous effluent may pass directly into the exit tube.

U.S. Pat. No. 4,138,219 to Colvert et al. shows regenerated catalyst withdrawal conduits extended into the fluidized bed up to the level of the solids inlet. In this device, the conduit opening is beveled so that its high side prevents flow directly from the inlet and catalyst must traverse the periphery of the regenerator wall and enter the opening over its low side. U.S. Pat. No. 3,394,076 to Bunn, Jr., et al. shows standpipe apertures facing away from the solids inlet for the same purpose as the beveled openings of Colvert et al. The standpipes of this latter reference also have a top opening in communication with the top of the bed to perform the overflow function previously described.

In the older units such as those above, slugging and bridging phenomena occurred primarily at the stripper to standpipe transition rather than in the regenerator withdrawal conduit which extended high into the fluidized bed so that the solids outlet opening was either at or above the solids inlet opening. The depth of catalyst bed above such prior art outlet openings is relatively shallow. In some of the more recent regenerator designs, however, the extension of the standpipe into the regenerator vessel has been eliminated so that the regenerated catalyst outlet is at the bottom of the vessel. This was done, at least in part, to make bed height relatively independent of the position of the solids outlet. Placement of the catalyst outlet at the bottom of the regenerator vessel resulted in an increase in the bed height above the outlet opening and a corresponding increase in fluid head and bed density in and around this opening. Instead of the shallow, low density bed of older designs, the bottom outlets see a relatively deep, high density bed of fluidized catalyst. The bottom outlet arrangement for fluidized regenerators is similar to the bottom outlet between a catalyst stripper and its associated standpipe. Stripper outlets have long been subjected to a relatively deep and dense bed of fluidized catalyst. This high bed density is believed to contribute to the slugging and bridging phenomena observed at the stripper to standpipe transition. Similar flow resistance can occur in regenerator withdrawal conduits with bottom outlets.

DISCLOSURE OF THE INVENTION

In accordance with the present invention, it has been found that a beveled or diagonally cut degasser insert installed around the bottom outlet between a larger vessel and a smaller conduit will virtually eliminate the tendency of catalyst exiting from a fluidized bed to bridge or slug within the conduit or in the area of the outlet opening. Use of this novel degasser at stripper to standpipe transitions has virtually eliminated the incidence of flow stoppage due to bridging and has significantly increased the mass flow rate through these vessels and conduits both during startup transients and normal operations.

The degasser wall of the present invention forms an extension of the conduit wall that projects upward into the vessel and has a beveled rim defining the outlet opening for fluidized catalyst. The entire cross-section of the outlet opening is positioned near the bottom of the catalyst bed where it is submerged in the densest portion of the fluidized phase.

The "degasser" of the present invention comprises a curved section of wall extending longitudinally upward and forming a partial extension of the conduit wall from the upper end of the outlet conduit to a free edge within the fluidized bed of the vessel. The wall section is curvilinear and preferably symmetrical about a longitudinal axis which may be canted to the vertical but preferably is substantially vertical. The free edge of the degaser wall is beveled to form the rim of an outlet opening into the conduit having a high side and a low side. By beveled is meant that a line tangent to both the high and low sides of the rim forms an angle of between 5° and 85° with the vertical. The bevel is preferably in the range of 25° to 60°, most preferably between 30° and 45°. A substantially planar rim is believed to be the most effective; however, the rim may have a non-planar shape such as concave or convex. In addition, the beveled degasser wall may extend only partway around the outlet opening, the remainder of the rim being formed by the upper end of the conduit itself. It should extend for more than 180°, preferably at least for 270° and most preferably for substantially 360°. In the axial direction, the wall section may be parallel to its symmetrical axis so that the degasser comprises a bias cut section of cylindrical wall or at an acute angle to its symmetrical axis so that the degasser comprises a bias cut section of conical wall. If a conical section, the acute angle between the wall and its axis is preferably less than 5°.

The degasser wall can be either a separate insert or an actual extension of the conduit wall. If a separate insert is used, it is preferably but not necessarily joined to the conduit wall, as by welding or the like. Since the degasser wall may be an extension of the conduit wall, the upper end of the outlet conduit is defined as that portion of the annular conduit wall ending at a horizontal plane passing through the low side of the outlet rim.

Steam or other gaseous medium for fluidizing the catalyst bed may be introduced into the vessel either below or above the rim of the degasser. In smaller diameter vessels, such as strippers, the fluidizing gas is preferably injected concentric to the degaser and below its rim. In larger vessels, such as regenerators, the fluidizing gas is preferably injected above the degasser. In either case, the degasser is located deep in the bed with the high side of the degasser rim below the catalyst inlet by about a distance equal to at least one-half of the depth of the dense phase bed. The low side of the degasser rim is preferably within one conduit diameter of the bottom of the fluidized bed, more preferably within one-quarter conduit diameter of the bottom and most preferably substantially adjacent to the bottom.

The longitudinal axis of the conduit may be either in axial alignment with or radially offset from the longitudinal axis of the vessel. Although usually approximating the vertical, the longitudinal axis of either the vessel or the outlet conduit, or both of these axes, may be canted to the vertical. The bottom wall of the regenerator or a stripper may also be canted by being conical or otherwise sloped to the horizontal. It is preferable that the diameter of the stripper be less than four times the diameter of the associated outlet standpipe. For example, the stripper diameter may be about 5 to 6 feet where the standpipe diameter is about 2 to 2½ feet. On the other hand, the ratio of the diameter of the regenerator to that of the associated outlet conduit, which may be either a stripper or a standpipe, is substantially larger than 4 to 1.

When used in a stripper, the rim of the degasser is preferably positioned beneath the outer projecting portion of the lowermost stripper baffle with the bevel of the rim approximately parallel to the incline of the baffle. In other words, the outer portion of a baffle plate projecting from the vessel wall upstream of the degasser is in opposed spaced relation to the outlet opening and parallel to the degaser rim. The axial distance between the high side of the rim and the baffle is preferably in the range of one-half to one and one-half times the conduit diameter and most preferably about one conduit diameter. It is also preferable that the outer portion of the baffle extend radially beyond the high side of the rim by a distance of from one-quarter to three-quarters of the conduit diameter such that the outermost edge of the baffle is approximately over the center of the outlet opening.

The biased degaser described above significantly reduces the flow resistance encountered in transferring fluidized solids from a large diameter vessel to a smaller diameter conduit. While not intending to be bound by any one theory of operation, it is believed that the device assists in separating the fluidizing gas of the vessel from the solids entering the conduit and thereby effects a substantial reduction in the amount of entrained gas carried into the conduit by the solids flow. In addition, the invention may provide an escape path for entrained gas subsequently released so that the backflow of this gas through the outlet opening does not unduly hinder entering solids flow. It is believed that any bubbles of entrained gas released after the catalyst enters the conduit migrate toward the wall beneath the high side of the degasser where they flow upward and out of the high side of the rim without interfering with the dynamics of entering solids flow. Thus, it is believed that the present invention results both in less gas entering the outlet conduit and in improved countercurrent flow of such quantities of entrained gas as are still released in the conduit. The improved catalyst flow through the fluidized bed outlet significantly increases the flow capacity of the conduit and the overall catalyst circulation rate for a given size system. The solids flow across the various vessel to conduit transitions in catalytic cracking and regeneration units is so improved that losses of catalyst circulation due to bridging or slugging has been practically eliminated.

It is therefore an object of the present invention to minimize the amount of excess gas entrained with solids flowing as a fluidized bed from a larger vessel or conduit to a smaller vessel or conduit. Another object of the invention is to increase the solids flow capacity of a smaller vessel or conduit receiving a flow of fluidized solids directly from a larger vessel or conduit. A further object of the invention is to reduce the flow resistance at outlet openings for discharging solids from a fluidized bed. A still further object of the invention is to improve the consistency of solids density and fluidity within relatively small transfer lines so as to minimize the need for injecting fluidizing gas to maintain solids fluidization and thereby effect a corresponding reduction in the number of gas injection lines required for movement of solids through such lines.

BRIEF DESCRIPTION OF THE DRAWINGS

The invention may be further understood by reference to the detailed description below taken in conjunction with the accompanying drawings in which.

BEST MODE FOR CARRYING OUT THE INVENTION

Figure 1:
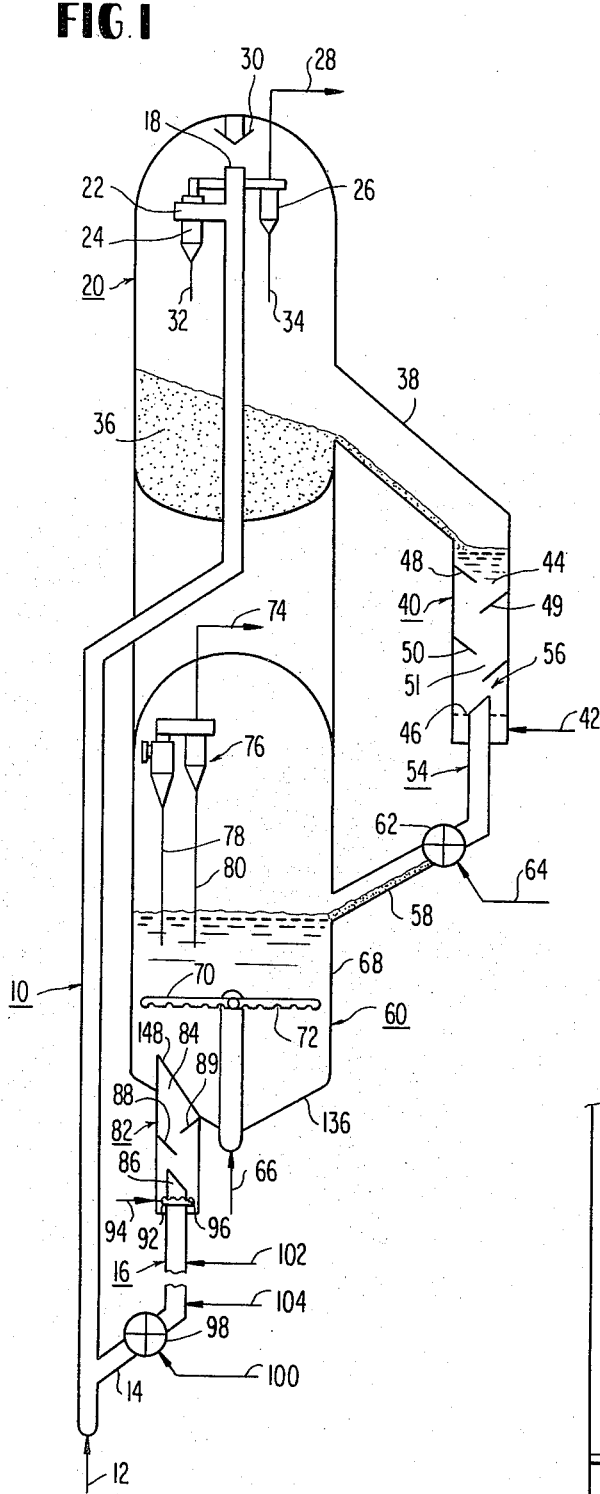
FIG. 1 is a schematic diagram of a catalytic cracking and catalyst regeneration unit employing the degasser of the present invention.

One embodiment of a system for utilizing the present invention is a catalytic cracking and catalyst regeneration unit as shown in FIG. 1. This unit has a reaction zone defined by a riser 10 to which is fed a heavy oil stream 12 and a hot regenerated catalyst stream 14 from a regenerated catalyst standpipe 16. Make-up catalyst may also be supplied either to the catalyst stream 14 or directly to the riser through a separate line not shown. Heat from the catalyst vaporizes the oil and the catalyst and oil vapor mixture is rapidly carried to the upper end of the riser by the expanding vapor and the pressure differential maintained between the regenerator and the reactor. The upward velocity of the catalyst and oil mixture may be further increased by the addition of diluent vapors such as steam or low-boiling hydrocarbons introduced into the riser through still other lines not shown. The riser 10 serves as the main reaction zone for catalytic conversion of heavy hydrocarbons with high boiling points to lighter hydrocarbons, such as gasoline, with lower boiling points. The riser is preferably of the vented type described in U.S. Pat. No. 4,071,059 to Myers et al. In this type of riser, the relatively heavy catalyst particles exit the upper end of the riser through an open top 18 within a reactor vessel 20. Lighter gaseous material is forced to flow through a sideleg 22 into a cyclone separator 24 by back pressure maintained in the reactor vessel. After passing through a second cyclone separator 26, the hydrocarbon gases and vapors pass out of the reactor vessel through an overhead line 28. The major portion of the riser catalyst leaves the open end of the riser and falls to the bottom of the reactor vessel after striking a conical deflector plate 30 positioned to protect the vessel head. A relatively small amount of catalyst is entrained in the gases exiting the main portion of the riser and is removed by the cyclone separators. The separator catalyst also falls to the bottom of the reactor vessel through diplegs 32 and 34. Catalyst falling to the bottom of the reactor vessel forms a loose catalyst bed 36. Although fluidation of the bed 36 was thought to be necessary at one time, it was found that the vented riser produced a sufficiently dry and loose catalyst bed to permit catalyst to be transferred from the reactor by gravity flow alone.

The catalyst from bed 36 is withdrawn from the reactor vessel 20 by an inclined carrier line 38 which conveys the catalyst to a stripper vessel 40 for the removal of residual hydrocarbons absorbed or otherwise retained on the catalyst particles. A stripping gas, such as steam, is supplied through a line 42 near the bottom of the stripper vessel and fluidizes the downwardly moving catalyst to form a fluidized bed 44. The stripping and fluidizing gas is fed to the bed through a distributor plate 46 which defines the bottom of the fluidized bed. A series of four baffles 48, 49, 50 and 51 aids in mixing the downflowing catalyst with upflowing gas and facilitates intimate contact between the catalyst particles and the stripping gas.

Immediately adjacent to distributor plate 46, the fluidized catalyst enters a spent catalyst standpipe 54 having a significantly smaller diameter than that of the stripper vessel itself. It is at this transition between the larger vessel and the smaller conduit that excess fluidizing gas can be carried into the conduit and cause a gas release resulting in bridging of non-fluidized catalyst particles either over the opening or lower down in the conduit. To eliminate entrainment and carry over of excess gas, a degasser 56 made according to the present invention is installed adjacent to distributor plate 46. The specific features of the degasser are described below.

Catalyst from the spent catalyst standpipe 54 is fed through a carrier conduit 58 into a catalyst regenerator 60. The flow of spent catalyst to the regenerator is controlled by a valve 62 which may be purged by introducing gas through a line 64 which keeps the catalyst particles from binding moving valve parts. The gas introduced through this line also maintains the fluidization of catalyst in standpipe 54. Upon entering the regenerator vessel, the downwardly moving catalyst is fluidized by a gas stream 66 to form a dense phase fluidized regenerator bed 68. The gas stream 66, which is usually air, is distributed within the fluidized bed by distribution pipes 70 having downwardly directed nozzles 72. The oxygen in this gas stream combines with the carbon on the spent catalyst in a combustion reaction generating carbon monoxide and carbon dioxide as combustion products. These combustion gases leave the regenerator through a vent line 74 after passing through a two-stage cyclone separator 76 which separates catalyst fines from the exiting combustion gases. Catalyst removed in the separator is returned to the catalyst bed through diplegs 78 and 80.

The downwardly moving catalyst in bed 68 flows out of the bottom of the regenerator to the regenerated catalyst standpipe 16 which in this unit is preceded by a regenerated catalyst stripper 82. It is to be understood that a regenerated catalyst stripper is optional and may be eliminated with the regenerated catalyst standpipe connected directly to the bottom of the regenerator vessel. At the outlet between the vessel and the regenerated catalyst stripper is a degasser 84 similar to the degasser 56 at the bottom of the spent catalyst stripper. A third degaser 86 is at the bottom outlet between the regenerated catalyst stripper 82 and its associated standpipe 16. Mixing baffles 88 and 89 are positioned in the regenerated catalyst stripper in a manner similar to the spent catalyst stripper arrangement described further below. Instead of using an apertured plate, stripping and fluidizing gas is distributed to the regenerated catalyst stripper through an annular type distributor pipe 92 fed by a gas line 94, the distributor having upwardly directed nozzles 96. The regenerator catalyst standpipe contains a slide valve 98 for controlling the flow of regenerated catalyst to the riser 10. Slide valve 98 also has a purge line 100 similar to the purge line for spent catalyst slide valve 62. Depending upon the length of standpipe 16, which may be relatively long where the reactor and regenerator vessels are offset instead of stacked as shown, additional lines 102 and 104 may be employed to introduce additional fluidizing media for maintaining catalyst fluidization along the entire length of the standpipe.

Figure 2:
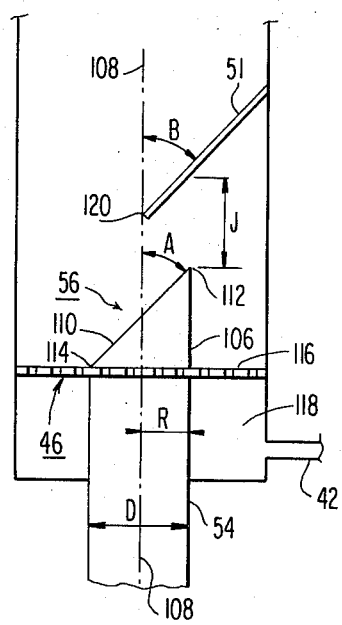
FIG. 2 is an enlargement of the invention as installed in the spent catalyst stripper of FIG. 1.

The basic features of each of the degasers 56, 84 and 86 are substantially the same and will now be described with reference to degaser 56 in spent catalyst stripper 40. As seen best in FIG. 2, the degaser 56 comprises a curvilinear wall 106 forming an extension of the smaller conduit 54. The free end of the wall is cut on the bias or at an oblique angle to a vertical axis 108 to form a beveled rim 110. The angle of the rim bevel is designated by "A" and the diameter of the conduit by "D". The beveled rim has a high side 112 and a low side 114. In the embodiment of FIG. 2, the low side of the biased rim is flush with the bottom of the fluidized bed which is defined by the upper surface 116 of the distributor plate 46, catalyst being prevented from entering the plenum chamber 118 by the higher pressure of the fluidizing gas. The upper side 112 of the beveled rim is positioned beneath the lowermost baffle plate 51 with an outer edge 120 of the projecting baffle being approximately over the center of the outlet opening formed by the rim 110. The baffle plate is spaced axially from upper side 112 by a distance "J" approximately equal to the conduit diameter "D". The baffle is preferably planar and positioned so that its outer portion is approximately parallel to the bevel of the rim. Thus, an angle "B" between the plane of the baffle and the vertical axis 108 is about equal to the bevel angle "A" of the rim. Although the biased degasser is effective alone, the proximity of the baffle enhances its effectiveness in reducing flow resistance caused by gas entrainment.

Although it is preferred that the incline of the baffle approximate that of the rim, it is to be understood that effective interaction between the baffle and the rim is not limited to that arrangement alone. The baffle may be perpendicular or at an obtuse angle to the vertical and spaced at greater or lesser distances from the upper side of the rim. Thus, angles "A" and "B" may differ significantly without departing from the scope of the invention. Both of these angles are preferably within the range of 5° to 85°, more preferably 25° to 60°, and most preferably 30° to 45°. The height "J" between the high side of the rim and the overlying surface of the baffle is preferably in the range of one-half to one and one-half times the conduit diameter "D", and most preferably approximates that diameter. The radial distance "R" between baffle edge 120 and the high side 112 of the rim is preferably in the range of one-quarter to three-quarters of the conduit diameter "D" and most preferably approximates one-half of that diameter.

Figure 3:
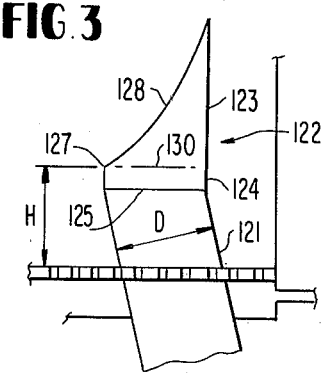
FIG. 3 illustrates a modification of the invention.

With reference to FIG. 3, the low side of the rim may be above the bottom of the fluidized bed by a distance "H", which is preferably equal to or less than conduit diameter "D". In this embodiment, a biased cut insert 122 has a degaser section 123 and an annular section or base 124, the annular base being welded to the conduit 121 along a weld line 125. Since the annular base of the insert actually forms a portion of the conduit, the upper end of the outlet conduit is defined by the horizontal plane which passes through the low side 127 of beveled rim 128, this plane being designated by the imaginary line 130. The upper ends of the conduits in FIGS. 4 and 5 are similarly designated by imaginary lines 132 and 134, respectively.

FIG. 3 also illustrates that the outlet conduit may be canted to the vertical. The degaser is preferably positioned relative to a canted conduit so that the high side of the rim lies to the high side of the conduit as defined by a plane perpendicular to the conduit's canted longitudinal axis. This allows rising gas bubbles flowing up the high side of the conduit to then flow up the high side of the degaser wall before reaching the outlet opening. The larger vessel could also be canted but this should not effect operation of the degasser. Similarly, a canted bottom wall, such as conical bottom wall 136 of regenerator 60 which intersects the wall of stripper 82 at an oblique angle, should not effect the degasing function of the invention.

Figure 4:
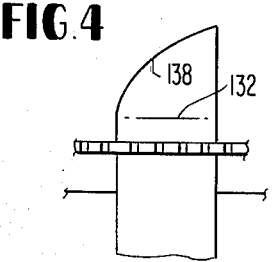
FIG. 4 illustrates another modification of the invention.
Figure 5:
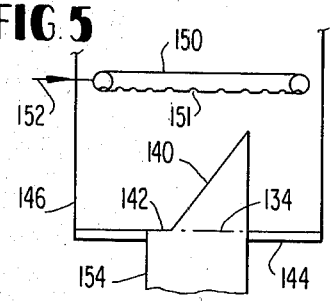
FIG. 5 illustrates still another modification of the invention.

A number of modifications to the degasser of the present invention are possible and a few of these modifications are illustrated in FIGS. 3 through 5 of the drawing. In FIG. 3, the beveled rim 128 of the degasser has a concave shape instead of the planar shape of the degasser in FIGS. 1 and 2. In FIG. 4, the beveled rim 138 has a convex shape. In FIG. 5, the beveled rim 140 does not go completely around the periphery of the outlet opening, the remainder of the opening comprising a horizontal rim 142 of conduit wall at its intersection with vessel wall 144. However, the beveled rim portion should extend around at least 180° of the opening periphery, preferably at least 270°, and most preferably about 360°. The regenerated catalyst standpipe in FIG. 1 and the smaller conduits in FIGS. 3 and 4 also illustrate that the low side of the beveled rim need not be exactly even with the bottom of the bed as previously discussed.

FIG. 5 further illustrates that the fluidizing medium may be introduced into a stripper vessel 146 above the outlet opening defined by rim portions 140 and 142. In this figure an annular fluidizing pipe 150 has downwardly directed nozzles 151 supplied with gas through a line 152. The pipe forms a ring concentric to the outlet conduit 154 and is positioned between the outlet opening and stripper wall 146. This arrangement is similar to the introduction of regeneration gas above the degasser 84 which has a beveled rim 148 defining the outlet opening between the regenerator vessel 60 and the regenerated catalyst stripper vessel 82 as shown in FIG. 1.

Other modifications and embodiments of the degasser of the present invention will be apparent to those skilled in the art from consideration of this disclosure as a whole. The foregoing specific embodiments are merely exemplary of the various embodiments possible and the true scope of the invention is not to be limited to those embodiments but is defined by the claims set out below.

Industrial Applicability

The foregoing invention can be used in a wide variety of systems where fluidized solid particles are to be transferred from one vessel or conduit to a smaller vessel or conduit. Accordingly, although the utility of the invention has been demonstrated in catalytic cracking units employing a fluidized catalyst, it is not limited to those systems. The invention will thus find industrial applications in any field of technology employing fluidized solid materials. Such fields include a wide variety of industrial processes involving contact between two or more reactants and a fluidized catalyst. Furthermore, processes in which the invention will find further utility need not involve catalysts at all, but merely the transport of fluidizable solids. One example of this latter application is in the fluidization of pulverized coal and its transport to the burners of large commercial boilers. The invention thus has extremely wide industrial applicability.

What is claimed is:

1. A solids transport system wherein particulate solids are transferred to a conduit from the dense phase of a fluidized bed within a vessel larger than said conduit, said system comprising:
   an upwardly extending solids outlet conduit with an open upper end for receiving a flow of solids from said dense phase bed;
   a degasser means for reducing the amount of gas entrained by said solids flow into said conduit, said degasser means including a substantially vertical curvilinear wall extending upward from said upper conduit end and cut on the bias to form a solids outlet rim beveled at an angle in the range of 5° to 85° to the vertical and having a low side abutting said upper conduit end and a high side forming an extension of said upper conduit end, said curvilinear wall adjoining and extending around at least the major portion of said upper conduit end and said high side being submerged within said dense phase bed; and,
   inlet means for introducing particulate solids into said vessel and means for maintaining said solids in a fluidized condition without imparting substantial swirling motion to said dense phase bed such that said flow of solids into said upper conduit end consists essentially of solids transferred through said outlet rim by the fluid head of said dense phase bed, said upper conduit end being at a depth in said dense phase bed sufficient under said fluidized conditions to cause said solids to have a tendency to lose fluidization within said conduit or across said conduit end in the absence of said degasser means, the high side of said rim being spaced below said inlet means by at least one-half the depth of said dense phase bed, and the upper end of said outlet conduit being located within about one conduit diameter of the bottom of said dense phase bed.

2. The transport system of claim 1 in which said solids are particles of catalyst having hydrocarbon conversion characteristics and carrying residual hydrocarbons, and in which said vessel is a stripper for physically removing said residual hydrocarbons from said catalyst by a process employing a stripping gas.

3. The transport system of claim 1 in which the low side of said rim is substantially adjacent to the bottom of said fluidized bed.

4. The transport system of claim 1 in which the angle of bevel of said rim is between 25° and 60° to the vertical.

5. The transport system of claim 1 in which the angle of bevel of said rim is between 30° and 45° to the vertical.

6. The transport system of claim 1 in which said beveled rim is planar in shape.

7. The transport system of claim 1 in which said degaser wall extends around the upper end of said outlet conduit through an arc of at least 270°.

8. The transport system of claim 7 in which said degaser wall extends around said upper conduit end through an arc of substantially 360°.

9. The transport system of claim 1 in which said solids are particles of catalyst carrying a second material and said solids are contacted with a gas to remove said second material from said solid catalyst in said vessel.

10. The transport system of claim 9 in which said vessel is a regenerator for chemically removing said second material from said catalyst by a chemical reaction.

11. The transport system of claim 1 in which said degasser means further includes a baffle positioned upstream of said open conduit end and cooperating with said curvilinear wall so as to further decrease the amount of gas entrained by said flow of solids into said outlet conduit.

12. The transport system of claim 11 in which said baffle extends radially beyond the high side of said beveled rim in spaced relation to said solids outlet.

13. The transport system of claim 12 in which said curvilinear wall has a symmetrical axis and said baffle has an inner edge positioned to approximately intersect an upstream extension of said symmetrical axis.

14. The transport system of claim 12 in which said baffle extends radially beyond the high side of said beveled rim by a distance in the range of about one-fourth to three-fourths of the diameter of said conduit.

15. The transport system of claim 14 in which said radial distance is about one-half of the diameter of said conduit.

16. The transport system of claim 12 in which said baffle has a planar shape and the plane of said baffle is at an angle of between 5° and 85° to the vertical.

17. The transport system of claim 16 in which said baffle angle and the angle of bevel of said rim are approximately the same.

18. The transport system of claim 16 in which said baffle is axially spaced from the high side of said beveled rim by a distance in the range of one-half to one and one-half times the diameter of said conduit.

19. The transport system of claim 18 in which said axial distance between the baffle and the high side of said rim is approximately equal to the diameter of said conduit.

* * * * *